United States Patent [19]

Damianakos et al.

[11] Patent Number: 4,759,706
[45] Date of Patent: Jul. 26, 1988

[54] MULTIPURPOSE CUTTING AND FORMING DEVICE

[76] Inventors: Gus Damianakos, 1368½ Dominion Street, Winnipeg, Manitoba, Canada, R3E 2P8; Harvey Winiasz, 518½ Selkirk Ave., Winnipeg, Manitoba, Canada, R2W 2M6

[21] Appl. No.: 53,469

[22] Filed: May 22, 1987

[51] Int. Cl.⁴ .................. B29C 39/04; A21C 11/10
[52] U.S. Cl. ........................... 425/289; 249/170
[58] Field of Search ............... 249/170; 425/292, 289; 30/123

[56] References Cited

U.S. PATENT DOCUMENTS 3,352,711  1/1971  Delaney ..................... 249/170
3,356,044  12/1967  Keathley et al. ............ 249/170

*Primary Examiner*—Willard Hoag
*Attorney, Agent, or Firm*—Stanley G. Ade; Adrian D. Battison; Murray E. Thrift

[57] ABSTRACT

A mould is provided which may be circular or rectangular when viewed in plan. It is divided into two halves by a hinge and has a pair of depressions one each side of the hinge line. The surrounding walls are serrated and they engage with one another when the mould is closed. The underside of the mould receives a cutter ring having an annular edge-sharpened wall which cuts a circle or rectangle of pastry or dough which then can be laid across the open mould, resting upon the serrations. Filling is placed on one-half of the pastry and the edges of the pastry may be moistened. The mould is then closed folding over the other half of the pastry onto the filling and clamping the moistened edges of the pastry together between the nesting serrations thus sealing the filling into the dough or pastry pocket so formed. Various sizes of cutters may be selectively secured to the underside of the mould.

10 Claims, 3 Drawing Sheets

MULTIPURPOSE CUTTING AND FORMING DEVICE

BACKGROUND OF THE INVENTION

This invention relates to new and useful improvements in pastry or dough moulds, particularly moulds adapted for use for the preparation of such food as perophy although it can be used to form other foods in which a circle or rectangle of pastry or dough receives a filling with the dough or shell being folded over upon the filling and may be used for other non-food uses.

Conventionally, the pastry or dough has first to be cut into the desired shape and filling has to be placed on one half thereof. The other half of the pastry or dough is then folded over, after the edges have been moistened, and the edges pressed together in order to seal the dough around the edges thus enclosing the filling within the pocket so formed. Such operations are extremely time consuming and require considerable skill in order that sufficient filling is enclosed yet not too much filling that spillage occurs.

SUMMARY OF THE INVENTION

The present invention overcomes disadvantages inherent with conventional methods of forming such foods and other wares and in accordance with the invention there is provided a forming mould for flexible sheets of material such as pastry dough and the like comprising in combination a substantially hollow hollow cylindrical base, a first, fixed mould portion or half formed integrally on one part of the upper side of said base and spanning same, and a second, movable mould portion or half hinged thereto, each half having a half dish configuration and including a substantially semicircular annular edge portion with a concave centre portion extending therefrom and a diametrical free edge extending from one of said end of said annular edge portion downwardly and across the concave base and then upwardly to the other end of said annular edge portion thus defining a common hinge line between said halves and in the open substantially planar position, hinge means at the ends of said semi-circular edge portion of said movable half operatively connecting to the ends of said semi-circular edge portion of said fixed half, said diametrical free edges being spaced apart from one another when said halves are in the closed position, to form a pouch-like fold to the dough and filling therein.

Another advantage of the invention is that a pair of edge-sharpened wall cutters are provided each of which selectively and detachably engages the underside of the mould opposite to the meeting edges so that it can act as cutter for the pastry or dough or other material thus forming a circle, or rectangle of the correct size. The two cutters in this embodiment are of slightly different sizes, one for bread and one for pastry.

A further advantage of the invention is to provide a device of the character herewithin described which facilitates the forming of pastry or dough pockets enclosing fillings or the like.

A yet further advantage of the invention is to provide a semi-circular recess below the one portion to facilitate the removal, by wiping, of any surplus material beyond the meeting edges of the mould.

Still another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings froming a part hereof, which includes a description of the best mode known to the applicants and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
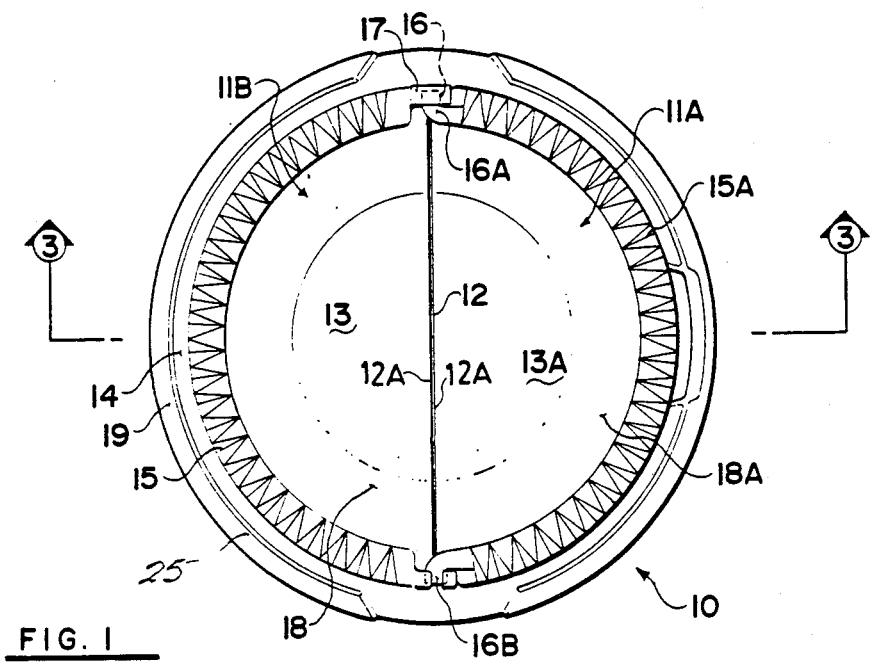
FIG. 1 is a top plan view of the mould in the open position.

Proceeding therefore to describe the invention in detail, FIGS. 1 to 6 show the mould collectively designated 10 which is preferably but not necessarily formed from synthetic plastic material.

The mould consists of two portions or halves, a fixed half 11 and a movable half 11A, which are symmetrical around a hinge connectively designated 12 which connects the two halves or portions together. The one half 11A is hinged by pins 16A on this movable portion 11A engaging blind apertures 16 on fixed portion 11. Although the mould in the drawings is shown as being substantially circular when viewed in plan and in the open position, nevertheless it will be appreciated that it can be rectangular or any other symmetrical configuration as desired.

Figure 4:
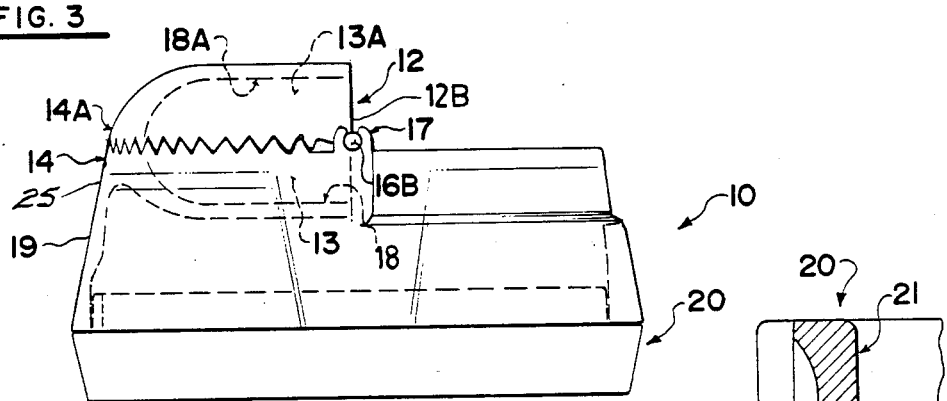
FIG. 4 is a view of the mould in the closed position.

Each mould portion or half 11 and 11A is formed with a depression 13, 13A surrounded by a semi-circular annular rim or wall 14, 14A with serrations or the like 15, 15A formed upon the mating rims and it should be appreciated that the serrations 15 are positioned relative to the serrations 15A so that they mesh one with the other when the mould is closed as clearly illustrated in FIG. 4.

When in the open position, it will be noted that the rim 14A of the movable half 11A includes flange portion 14B extending or overlying a substantially vertical recess 25 which extends around the upper part of the wall 19 which supports half 11A. This permits the fingers of the operator to engage the underside of the flange in order to fold 11A over onto 11 without touching the pastry.

It will be appreciated that only one portion of the mould may be provided with a depression 13 or 13A depending upon design parameters. It will also be appreciated that the serrations may not be incorporated but, instead, smooth mating edges may be utilized.

Figure 7:
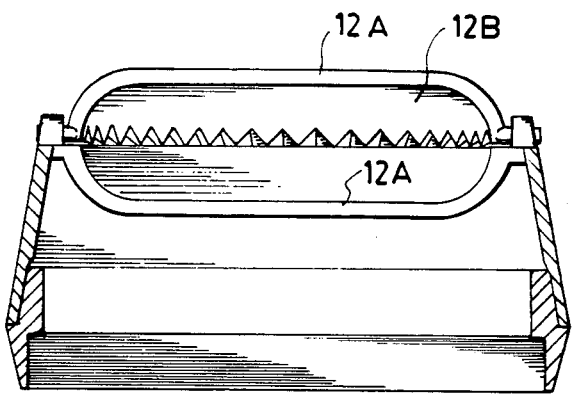
FIG. 7 is a fragmentary, partially sectioned view of FIG. 4 from the right-hand side thereof.

The hinge 12 is formed by the provision of the two outwardly extending pins 16A, one each side of the hinge line 12 on the half 13A, engageable with corresponding blind apertures 16 formed in lugs 17 on each end of the hinge line 12 on half 13. In order to facilitate assembly, one aperture 16B (see FIG. 1) may be slotted to the upper surface so that pin 16 may be engaged in the opposite aperture and the other pin may be snap engaged into the slotted aperture. When in the closed position as shown in FIG. 4, the two surfaces 18 and 18A are spaced apart from one another even although the serrations are fully meshed, thus forming a cavity for the perohy as will hereinafter be described, with the edge 12A of the halves defining the hinge line 12 when open, being spaced apart as will be seen from FIG. 7.

Figure 2:
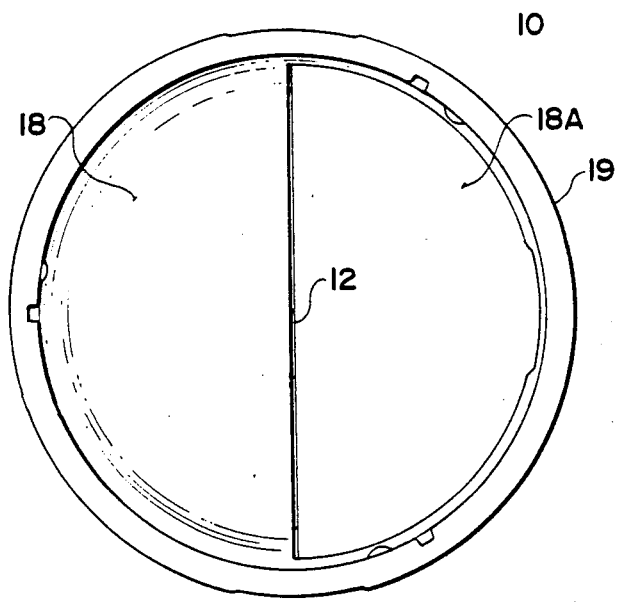
FIG. 2 is an underside view along the lines 3—3 of FIG. 1 with the large cutter in place.

In operation, a circle or square or other configuration of pastry is cut from a rolled sheet of pastry (not illustrated) as will hereinafter be described and this cut-out portion is laid upon the upper side of the mould which is in the open position shown in FIG. 2 with the edges of the pastry overlying the serrations.

Filling (not illustrated) is placed within one depression either 13 or 13A (preferably 13) of the mould whereupon the mould is closed by lifting the half 11A by the flange 14B, thus folding the free side of the pastry over the filling and onto the other side thereof, the edge being moistened with water, milk or the like, to assist in sealing. Pressure upon the two halves of the mould in the closed position seals the edges around the semi-circular serrated edges thereof and in this connection, it should be noted that the space 12B between the edges 12A of the halves, permit the folding over of the pastry without pinching same yet at the same time permit the fold to extend through the space 12B particularly if too much filling has been used.

In any event, the forming of perohies requires a pouch-like configuration rather than a pinched sealed edge all the way around the finished product to permit a greater amount of filling to be included.

Upon opening the mould, the formed pocket of dough with the filling enclosed therein may be tipped out into the hand of the operator and further processing may then be undertaken.

Figure 3:
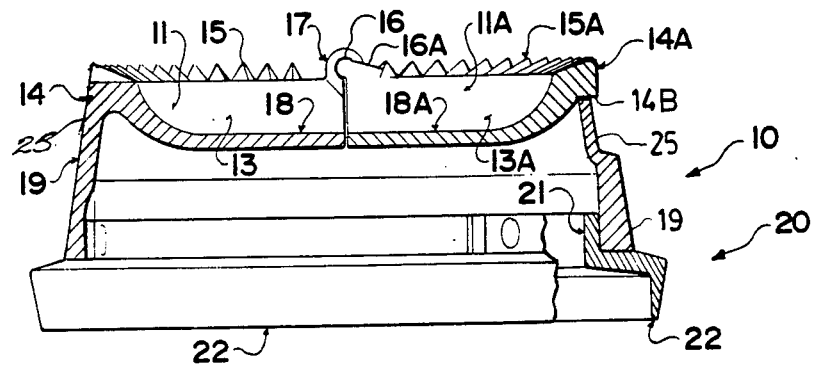
FIG. 3 is a sectional side elevation of FIG. 1.
Figures 5, 6:
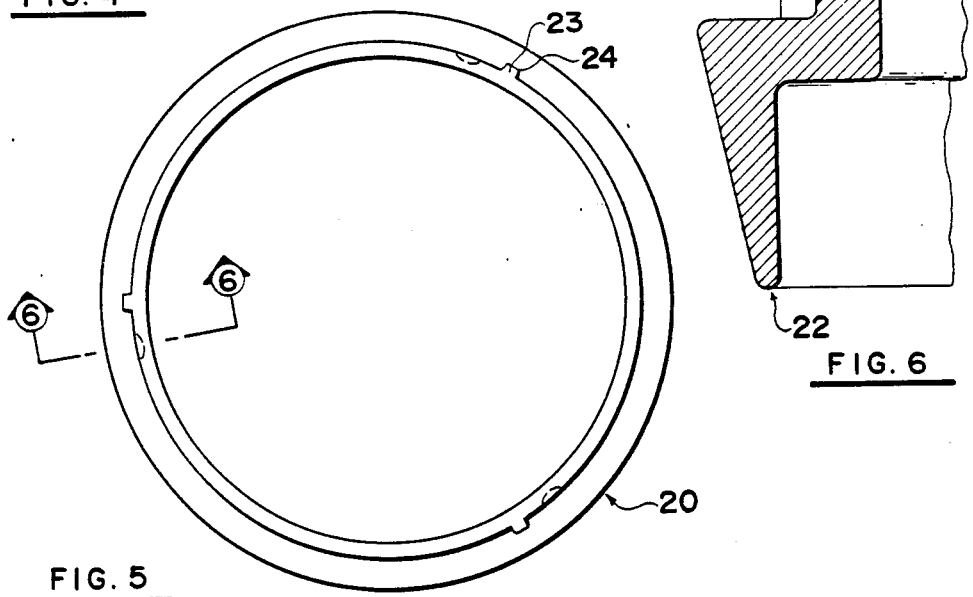
FIG. 5 is a plan view of the small cutter per se.
FIG. 6 is an enlarged section along the line 6—6 of FIG. 5.

Dealing next with the cutting of the dough or other material such as bread which may be used for the formation of the enclosures, the mould 10 is formed with an annular hollow body portion 19 and detachably secured within the underside of this body portion is one of a plurality of cutter rings each collectively designated 20. They are similar in configuration with the exception that the size of the cutting edge varies from ring to ring. Each ring comprises a mould body engaging portion or ring 21 engaging within the base of the body portion 19 of the mould, and extending downwardly to an edge-sharpened cutter ring annulus 22 on the lower side thereof. In the present embodiment, two such rings are shown, a relatively small ring in FIG. 4 and a larger ring in FIGS. 3, 5 and 6. In this particular embodiment, the smaller ring is for cutting circles of bread or the like which, when installed within the upper side of the mould and filled with filling, are substantially equal in diameter to the outer diameter of the upper side of the mould. When used with pastry, the larger ring shown in FIGS. 3, 5 and 6 is preferred because of the tendency of pastry to shrink slightly when cut from a rolled out sheet.

In either case, means are provided to detachably secure the ring within the base of the wall portion 19 and may take the form of projections 23 formed around the outside perimeter of the portion 21 of the rings which snap engage within recesses 24 formed on the inner surface of the base of the wall portion 19.

Although the enclosed description refers to the device as being used for food products, it will be appreciated that other, non-food products may be pouched by the device, with flexible material in sheet form, placed within the mould and sealed by heat sealing, adhesive or by other means.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A forming mould for flexible sheets of material such as pastry dough and the like comprising in combination a substantially hollow cylindrical base, a first, fixed mould portion or half formed integrally on one part of the upper side of said base and spanning same, and a second, movable mould portion of half hinged thereto, each half having a half dish configuration and including a substantially semi-circular annular edge portion with a concave centre portion extending therefrom and a diametrical free edge extending from one of said end of said annular edge portion downwardly and across the concave base and then upwardly to the other end of said annular edge portion thus defining a common hinge line between said halves and in the open substantially planar position, hinge means at the ends of said semi-circular edge portion of said movable half operatively connecting to the ends of said semi-circular edge portion of said fixed half, said diametrical free edges being spaced apart from one another when said halves are in the closed position, to form a pouch-like fold to the dough and filling therein, and a cutter ring selectively snap-engageable upon the underside of said base and including an annular, edge-sharpened wall formed on the outer surface thereof and defining an area slightly larger than the area defined between said semi-circular edges of said mould, said edge-sharpened circular wall acting as a pastry or dough cutter.

2. The invention according to claim 1 which includes a substantially vertical semi-annular recess formed around the upper portion of the wall of said base on said other portion thereof, said movable half of said mould having a semi-circular flange formed around said semi-circular edge portion and extending outwardly therefrom and overlying the upper side of said recess when in the open position, said flange being engageable by the fingers of the operator to lift said movable half of said mould and move same to the closed position.

3. The invention according to claim 1 in which said semi-circular edge portions are serrated and interengaged in meshing relationship with one another when in the closed position.

4. The invention according to claim 3 which includes a substantially vertical semi-annular recess formed around the upper portion of the wall of said base on said other portion thereof, said movable half of said mould having a semi-circular flange formed around said semi-circular edge portion and extending outwardly therefrom and overlying the upper side of said recess when in the open position, said flange being engageable by the fingers of the operator to lift said movable half of said mould and move same to the closed position.

5. A forming mould for flexible sheets of material such as pastry dough and the like comprising in combination a substantially hollow cylindrical base, a first, fixed mould portion or half formed integrally on one part of the upper side of said base and spanning same, and a second, movable mould portion or half hinged thereto, each half having a half dish configuration and including a substantially semi-circular annular edge portion with a concave centre portion extending therefrom and a diametrical free edge extending from one of said end of said annular edge portion downwardly and across the concave base and then upwardly to the outer end of said annular edge portion thus defining a common hinge line between said halves and in the open substantially planar portion, hinge means at the ends of said semi-circular edge portion of said movable half operatively connecting to the ends of said semi-circular edge portion of said fixed half, said diametrical free edges being spaced apart from one another when said halves are in the closed position, to form a pouch-like fold to the dough and filling therein, and a substantially vertical semi-annular recess formed around the upper portion of the wall of said base on said other portion thereof, said movable half of said mould having a semi-circular flange formed around said semi-circular edge portion and extending outwardly therefrom and overlying the upper side of said recess when in the open position, said flange being engageable by the fingers of the operator to lift said movable half of said mould and move same to the closed position.

6. The invention according to claim 5 which includes a cutter ring selectively snap-engageable upon the underside of said base and including an annular, edge-sharpened wall formed on the outer surface thereof and defining an area slightly larger than the area defined between said semi-circular edges of said mould, said edge-sharpened circular wall acting as a pastry or dough cutter.

7. The invention according to claim 6 which includes a substantially vertical semi-annular recess formed around the upper portion of the wall of said base on said other portion thereof, said movable half of said mould having a semi-circular flange formed around said semi-circular edge portion and extending outwardly therefrom and overlying the upper side of said recess when in the open position, said flange being engageable by the fingers of the operator to lift said movable half of said mould and move same to the closed position.

8. The invention according to claim 5 in which said semi-circular edge portions are serrated and interengaged in meshing relationship with one another when in the closed position.

9. The invention according to claim 8 which includes a cutter ring selectively snap-engageable upon the underside of said base and including an annular, edge-sharpened wall formed on the outer surface thereof and defining an area slightly larger than the area defined between said semi-circular edges of said mould, said edge-sharpened circular wall acting as a pastry or dough cutter.

10. The invention according to claim 7 which includes a substantially vertical semi-annular recess formed around the upper portion of the wall of said base on said other portion thereof, said movable half of said mould having a semi-circular flange formed around said semi-circular edge portion and extending outwardly therefrom and overlying the upper side of said recess when in the open position, said flange being engageable by the fingers of the operator to lift said movable half of said mould and move same to the closed position.

* * * * *